United States Patent [19]

Gademann et al.

[11] Patent Number: 5,531,091
[45] Date of Patent: Jul. 2, 1996

[54] SENSOR WITH QUARTZ TUNING FORK

[75] Inventors: Lothar Gademann, Rottenburg; Klaus Miekley, Ludwigsburg; Botho Ziegenbein, Reutlingen; Andreas Reppich, Leonberg, all of Germany

[73] Assignee: Robert Bosch GmbH, Stuttgart, Germany

[21] Appl. No.: 311,076

[22] Filed: Sep. 23, 1994

[30] Foreign Application Priority Data

Sep. 28, 1993 [DE] Germany .......................... 43 32 944.6

[51] Int. Cl.⁶ .......................... G01D 3/036; G01D 11/24
[52] U.S. Cl. .......................... 73/1 DV; 73/32 A; 73/431; 73/514.29; 310/370; 364/571.04
[58] Field of Search .......................... 73/1 DV, 1 R, 73/1 D, 2, 866.1, 866.5, 431, DIG. 1, DIG. 4, 651, 778, 517 AV; 310/314, 315, 346, 348, 370; 364/571.01, 571.04, 571.07, 571.08

[56] References Cited

U.S. PATENT DOCUMENTS

| | | | |
|---|---|---|---|
| 4,142,161 | 2/1979 | Gray | 310/370 X |
| 4,345,118 | 8/1982 | Takemura | 381/198 |
| 4,349,881 | 9/1982 | November et al. | 73/32 A X |
| 4,415,827 | 11/1983 | Chuang | 310/370 |
| 4,421,621 | 12/1983 | Fujii et al. | 310/344 X |
| 4,633,124 | 12/1986 | Kawashima | 310/340 |
| 5,157,472 | 10/1992 | Takemura | 73/777 X |
| 5,269,185 | 12/1993 | Froidevaux | 73/517 AV X |
| 5,302,880 | 4/1994 | Kaida | 310/346 X |
| 5,325,574 | 7/1994 | Takagi et al. | 310/370 X |

FOREIGN PATENT DOCUMENTS

| | | | |
|---|---|---|---|
| 25589129 | 7/1976 | Germany | 310/370 |
| 2817212 | 5/1979 | Germany . | |
| 2949376 | 6/1980 | Germany . | |
| 4138056 | 5/1992 | Germany . | |
| 152448 | 11/1979 | Japan | 310/370 |
| 49013 | 4/1980 | Japan | 310/370 |
| 188124 | 11/1982 | Japan | 310/370 |
| 2100504 | 12/1982 | United Kingdom | 310/370 |

*Primary Examiner*—Thomas P. Noland
*Attorney, Agent, or Firm*—Kenyon & Kenyon

[57] ABSTRACT

A sensor device has a quartz tuning fork and an analysis circuit arranged on a common board inside a common housing. The quartz tuning fork has its own, second housing within the common housing for acoustically decoupling the tuning fork from the analysis circuit. The second housing also has an opening for equalizing the pressure and temperature between the second housing and the rest of the common housing. The analysis circuit, which is connected via the electrical wires to the quartz tuning fork, performs linearization, signal amplification and elimination of environmental influences on the signals emitted by the quartz tuning fork. The signals processed by the analysis circuit are further transmitted via common housing's electrical contacts to external elements. Because of the physical proximity of the quartz tuning fork and the analysis circuit, interference attributable to electrical connections between the two elements is minimized. Furthermore, because the tuning fork and the analysis circuit are exposed to the same temperature, temperature-related fluctuations in the electrical signals of the tuning fork may be accurately counter-balanced by the analysis circuit.

10 Claims, 1 Drawing Sheet

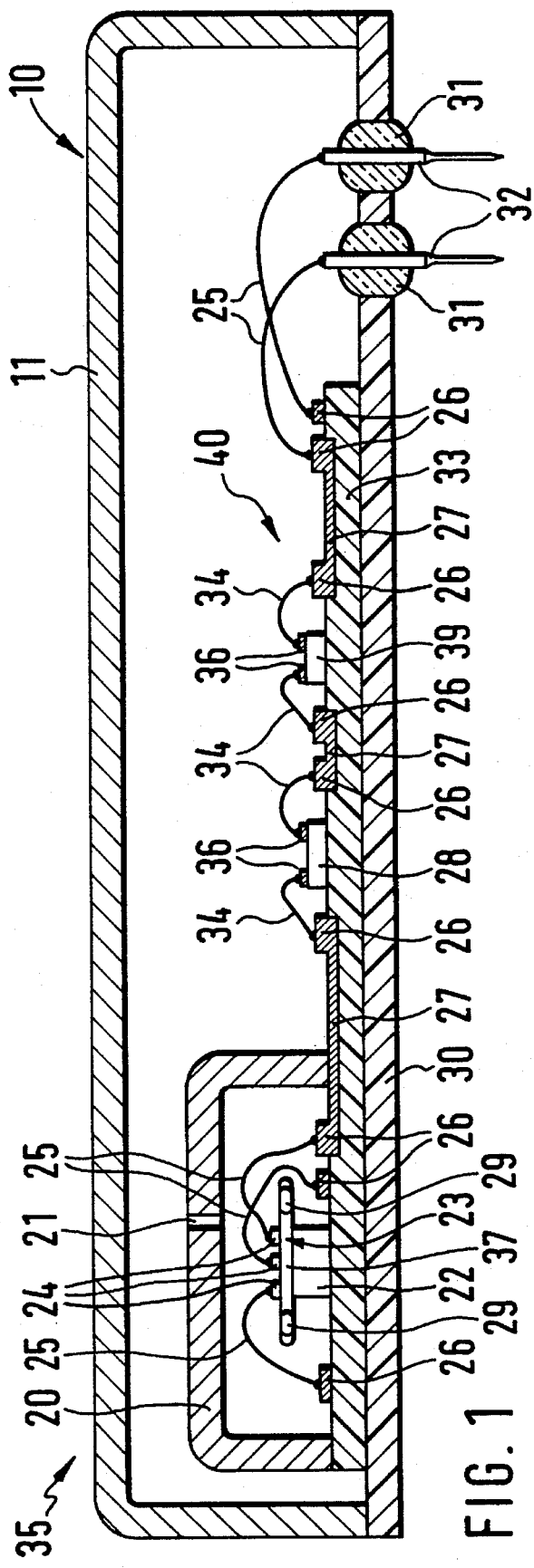
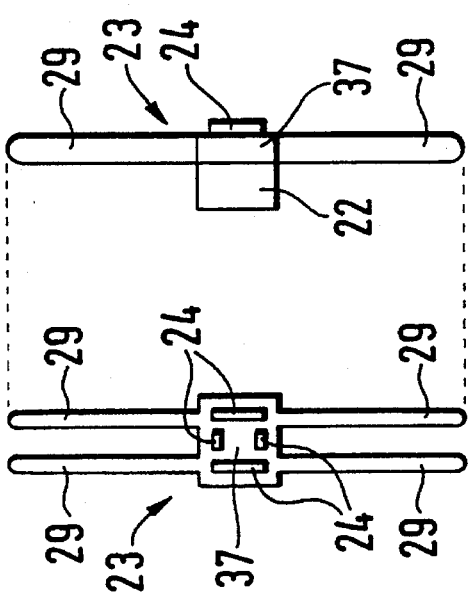
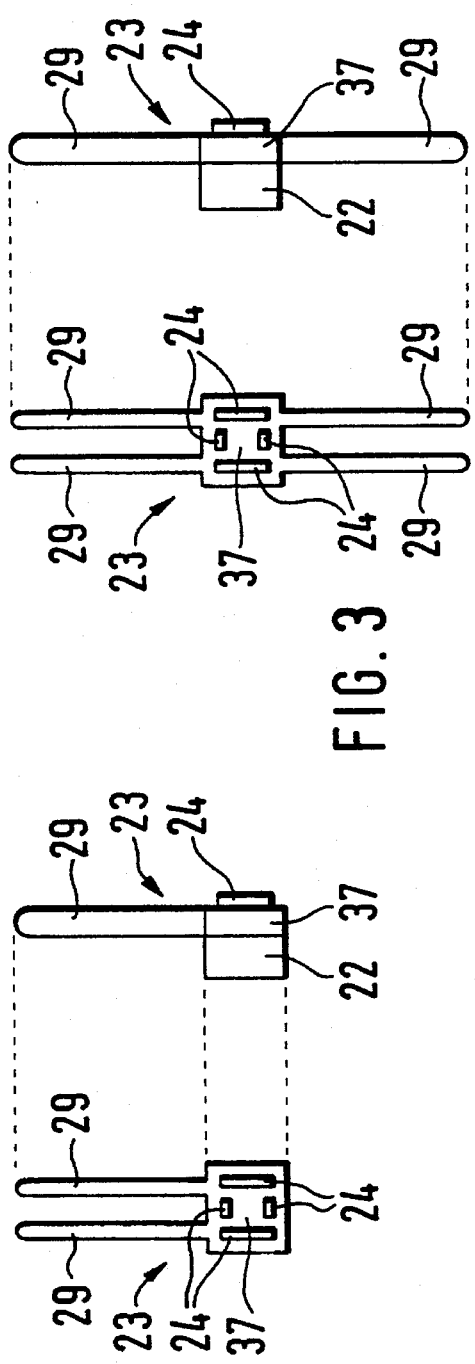

SENSOR WITH QUARTZ TUNING FORK

BACKGROUND INFORMATION

Adhesively bonding quartz tuning forks into a steel housing and conveying the signals emitted by the quartz tuning fork, via solder points and glass passthroughs, out of the steel housing where they can be delivered to an electronic analysis circuit is known. However, the final installed system, consisting of the tuning fork enclosed in the housing and the external analysis circuit, must be balanced (i.e., calibrated) after the analysis circuit has been connected to the sensor comprising the enclosed tuning fork. This balancing compensates for interference, especially interference resulting from the arrangement itself. In addition, the analysis circuit must be protected with a further housing. Thus, there exists a need for a sensor that does not need to be balanced and that does not require a separate housing for an analysis circuit.

SUMMARY OF THE INVENTION

In the sensor according to the present invention, the sensor and analysis circuit are advantageously arranged together in one housing. As a result, the analysis circuit is protected against mechanical and electrical interference. The present invention meets the above-mentioned need by arranging a sensor with a quartz tuning fork in a gas-tight housing. The housing has electrical contact surfaces at which electrical signals can be delivered to external elements or provided from external elements. The housing also includes gas-tight passthroughs to guide electrical signals into and out of the housing.

Both the quartz tuning fork and an electronic analysis circuit for processing the electrical signals are accommodated on a board which is provided in the housing. Moreover, the sensor can be embodied with the analysis circuit directly after manufacture, such that interference, in particular interference due to the geometry of the sensor configurations, is eliminated by a compensation means in the analysis circuit. Rebalancing of the sensor with the analysis circuit is not necessary thereafter. The connections between the analysis circuit and the sensor can also be kept short because of their physical proximity. These shorter connections decrease interference that can affect the sensor.

The board is preferably a ceramic substrate and the analysis circuit is preferably a hybrid circuit so that cost-effective production of the sensor can be achieved. A further housing above the quartz tuning fork advantageously acoustically decouples the tuning fork from the analysis circuit. By providing an opening in the further housing above the quartz tuning fork, the tuning fork is advantageously exposed to the same air pressure and the same temperature as the analysis circuit. As a result, temperature-related fluctuations in the electrical signals of the quartz tuning fork are balanced by those of the analysis circuit. When correction values are stored in the analysis circuit, the sensitivity of the sensor and its characteristics can be adjusted, in particular linearized, by the analysis circuit as the sensor is being manufactured.

A pedestal mount for the quartz tuning fork is particularly advantageous and easily implemented. Silicon, Pyrex, ceramic, or a printed pedestal are preferred as materials for the pedestal since they can easily be combined with hybrid circuits on ceramic substrates. Mounting the quartz tuning fork onto the pedestal by means of adhesives is also advantageous since this mounting method is particularly inexpensive and simple. A vacuum in the housing advantageously minimizes damping of the quartz tuning fork's vibration.

BRIEF DESCRIPTION OF THE DRAWINGS

FIG. 1 is a cross-sectional side view of a sensor according to the present invention.

FIG. 2 shows a first embodiment of a quartz tuning fork of the present invention.

FIG. 3 shows a second embodiment of a quartz tuning fork of the present invention.

DETAILED DESCRIPTION

FIG. 1 depicts a housing 10 including a cover 11 and a base plate 30. A board 33 is mounted inside housing 10 on base plate 30. A square pedestal 22 is mounted on board 33 and carries a quartz tuning fork 23. The quartz tuning fork 23 has a base element 37 and vibrating arms 29. The vibrating arms 29 can vibrate freely in the space around the quartz tuning fork 23.

The configuration of the quartz tuning fork 23 is explained in more detail with reference to FIG. 2. The quartz tuning fork 23 has four contact surfaces 24. Connecting wires 25 couple the contact surfaces 24 with contact points 26 on the board 33. The quartz tuning fork 23, the contact points 26, and the connecting wires 25, are enclosed by a further housing 20 which rests on the board 33. From the contact points 26, conductor paths 27 lead between the board 33 and the further housing 20 to further contact points 26 on the board 33.

The board 33 also carries a memory apparatus 28 and a further component 39. The memory apparatus 28 and the further component 39 are electrically coupled by further connecting wires 34, contact points 26, and conductor paths 27 to form an analysis circuit 40. The analysis circuit 40 is coupled, via two further connecting wires 25, with two contact pins 32. The two contact pins project out of housing 10 through passthroughs 31 arranged in base plate 30.

The arrangement including the housing 10 with the board 33, the analysis circuit 40, the further housing 20, and the quartz tuning fork 23 constitutes a sensor 35. A sensor 35 configured in this manner can be used, for example, to measure the angular velocity of a rotary motion. By means of two of the four contact surfaces 24 on quartz tuning fork 23, the quartz tuning fork 23 is excited by means of the piezoelectric effect to vibrate in a vibration plane at its resonant frequency. Movement of sensor 35 in a plane different from the vibration plane causes a change in that vibration. This results, again by means of the piezoelectric effect, in an electrical signal that is present at the two further contact surfaces 24 which are positioned perpendicular to the excited contact surfaces 24 on tuning fork 23.

The signal emitted by tuning fork 23 passes via connecting wires 25 to analysis circuit 40, where linearization, signal amplification, and elimination of environmental influences such as temperature and air pressure can be performed. The signal processed by analysis circuit 40 then passes, via further connecting wires 25, to the contact pins 32. The contact pins 32 pass through the passthroughs 31 where they can be tapped.

Equalization of temperature and pressure, which ensures identical environmental conditions for the quartz tuning fork 23 and the analysis circuit 40, can occur through the opening 21 in the further housing 20. The further housing 20 shields quartz tuning fork 23 from interfering echoes that may be caused, for example, by analysis circuit 40. To achieve good vibratory capability for quartz tuning fork 23, a vacuum is applied to the interior of the housing 10. The vibratory excitation circuit of the quartz tuning fork 23 is also integrated into the housing 10.

FIG. 2 illustrates a quartz tuning fork 23 in a first embodiment, in a plan view and in a side view. A rectangular base element 37 has two elongated vibrating arms 29, as well as contact surfaces 24 lying opposite one another and distributed on its surface at the edge of base element 37. While two of the four contact surfaces 24 excite vibration at the resonant frequency, a signal proportional to the angular velocity of sensor 35 can be tapped at the other two contact surfaces 24. The base element 37 of quartz tuning fork 23 is applied on a pedestal 22.

FIG. 3 shows a further exemplary embodiment of a quartz tuning fork 23 which is similar to the quartz tuning fork 23 depicted in FIG. 2 but which has two further vibrating arms 29. The two further vibrating arms 29 are attached on the side of the rectangular base element 37 lying opposite of the two vibrating arms 29. This embodiment of quartz tuning fork 23 results in a stronger piezoelectric effect, and thus in a higher signal emitted by quartz tuning fork 23. By varying lengths and cross sections of the vibrating arms 29, a variety of resonant frequencies can be set.

What is claimed is:

1. A sensor comprising:
    a) a gas-tight housing having gas-tight passthroughs to guide electrical signals into and out of said gas-tight housing;
    b) a board, said board arranged within said gas-tight housing;
    c) a quartz tuning fork
        i) being arranged on said board within said gas-tight housing, and
        ii) having electrical contact surfaces at which the electrical signals are delivered and derived via connector wires; and
    d) an analysis circuit for processing the electrical signals, said analysis circuit being arranged on said board within said gas-tight housing.

2. The sensor according to claim 1 wherein said board is a ceramic substrate and wherein said analysis circuit is a hybrid circuit.

3. The sensor according to claim 1 further comprising a further housing, said further housing being arranged on said board and over said quartz tuning fork.

4. The sensor according to claim 3 wherein an opening is defined in said further housing.

5. The sensor according to claim 1 wherein said analysis circuit includes a memory apparatus for storing values that correct the electrical signals from the quartz tuning fork and corrupted by the sensor.

6. The sensor according to claim 1 further comprising a pedestal, said pedestal mounting said quartz tuning fork on said board.

7. The sensor according to claim 6 wherein said pedestal is made of at least one of silicon, Pyrex, and a ceramic.

8. The sensor according to claim 6 wherein said pedestal is printed.

9. The sensor according to claim 6 wherein said quartz tuning fork is adhesively bonded onto said pedestal.

10. The sensor according to claim 1 wherein a vacuum is created in said housing.

* * * * *